Patented Nov. 30, 1943

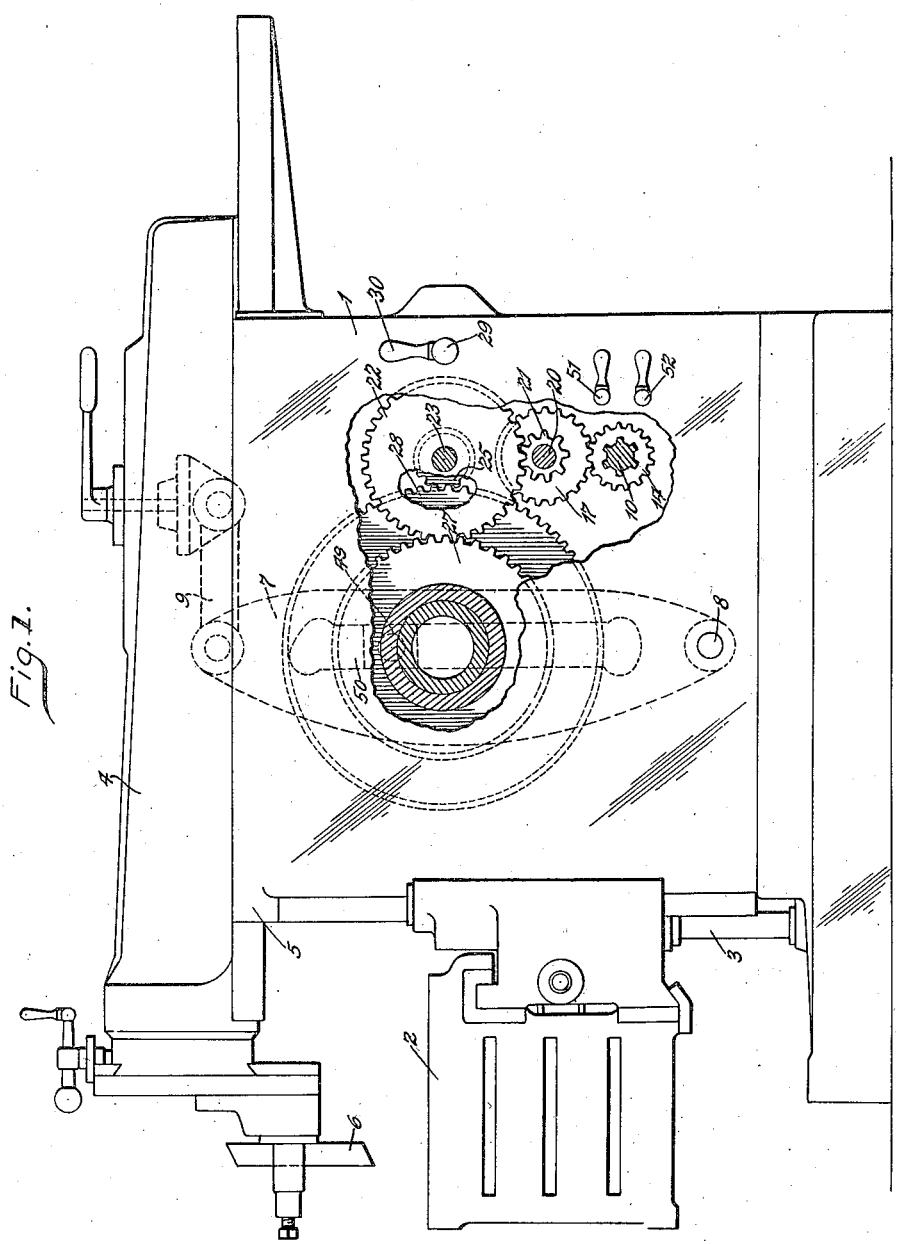

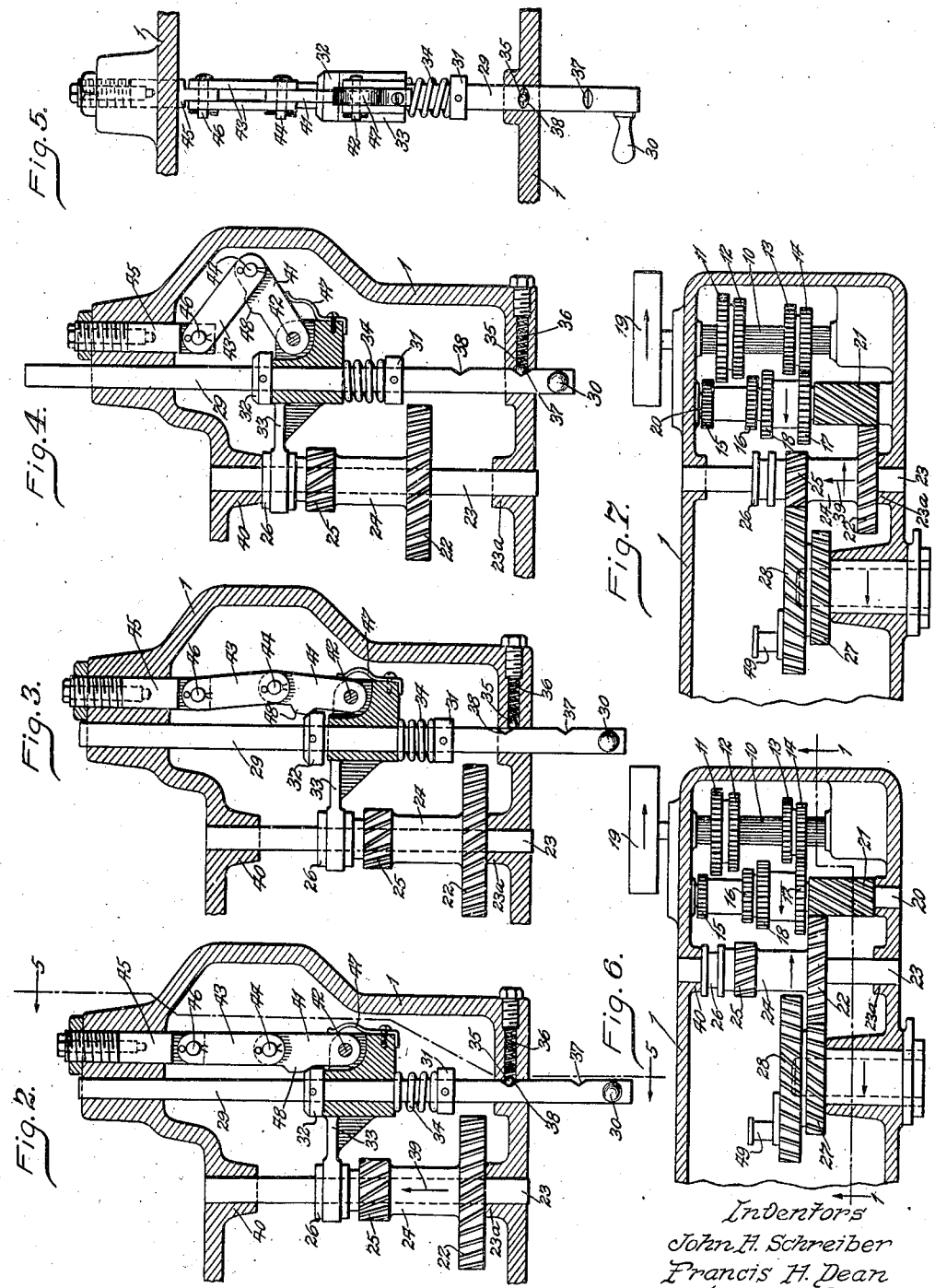

2,335,797

UNITED STATES PATENT OFFICE 2,335,797

GEAR SHIFT LOCKING DEVICE

John H. Schreiber, St. Louis, and Francis H. Dean, Normandy, Mo., assignors to General Engineering & Mfg. Co., St. Louis, Mo., a corporation of Missouri Application May 18, 1942, Serial No. 443,434

6 Claims. (Cl. 74—342)

This invention relates to gear shift locking devices; and has special reference to locking devices for selective helical gearing.

It is generally recognized that helical gears afford definite advantages over ordinary spur or straight-faced gears, because they provide better continuity of action, increased strength because of better stress distribution, and because at least two teeth are in mesh in the plane of the axes of the gears, thereby reducing vibration to a minimum. However, because of the inherent characteristic of engaged helical gears to exert thrust forces in the direction of their axes, it is necessary that they be confined or controlled to overcome the tendency of the gears to move out of engagement with each other when they are rotated for power transmission. It is also known that the thrust action on the intermediate helical gear in a train of three helical gears operating on parallel shafts will be balanced, making it unnecessary to provide means to prevent a laterally shiftable intermediate gear from moving laterally along its axis when power is being transmitted through a train of three helical gears. To obtain quiet or substantially noiseless operation and subsequent long life or durability of the helical gears, it is desirable that the gears forming a power transmission unit be arranged so as to maintain a minimum pitchline velocity consistent with adjustment or regulation of the desired output speed.

Therefore, one object of this invention is to combine all of the advantages of the helical gears with the advantages of gears designed for operation at a minimum pitchline velocity.

Other objects are to provide means for preventing longitudinal displacement of helical gears fashioned for selective output speeds irrespective of the helix angle of the gear teeth; and to provide a device for controlling said means automatically and as an incident to a manual movement of a speed selecting control device.

Other objects of the invention will be apparent from the following description, reference being made to the annexed drawings, in which—

Fig. 1 is a side elevation of a shaping machine equipped with our improved gear shift locking device, parts being broken away, and other parts shown in section along the line 1—1 of Fig. 6 in order to show the arrangement of the gears more clearly.

Fig. 2 is a sectional view showing the device for shifting intermediate helical gears to different adjusted positions for selective output speeds, the retaining device being in position to hold the intermediate gears in one adjusted position.

Fig. 3 is a similar sectional view showing the retaining device for the intermediate gears displaced to permit shifting of said gears.

Fig. 4 is a view showing the retaining device and intermediate gears in the positions they occupy after a shifting movement of the intermediate gears has been completed.

Fig. 5 is a sectional view on the line 5—5 of Fig. 2.

Fig. 6 is a developed plan view showing an entire gearing train arranged for low speed in direct drive.

Fig. 7 is a similar developed plan view showing the gearing train arranged for the lowest possible speed of the tool carrier and having the intermediate gears shown in the same position as in Fig. 2.

For convenience, the present invention is shown in Fig. 1 embodied in a shaping machine of a familiar type such as that disclosed in our copending application for patent filed December 12, 1940, Serial No. 369,698.

Such a machine comprises a frame 1 provided with a work support 2 connected for vertical adjustment with a shaft 3. In this familiar machine, the carriage 4 is mounted for horizontal reciprocating movements along guides 5 and supports a tool 6 for operating on the work located on the support 2 when the carriage 4 and thereby the tool 6 are reciprocated.

The machine includes a rocker arm 7 having its lower end supported by a pivot 8 mounted in the frame 1 and having its upper end connected with the carriage 4 by a link 9 for imparting reciprocating movement to said carriage when the rocker arm 7 is oscillated or rocked upon its supporting pivot 8. The link 9 may be of conventional construction, or it may be of the novel construction disclosed in our said copending application.

The conventional or known mechanism of the shaper in which the present invention is embodied includes a shaft 10 having splined thereon variable speed gears 11, 12, 13 and 14. The gears 11 and 12 are attached together as a unit, and the gears 13 and 14 are also attached together as a unit separate from the unit formed by the gears 11 and 12. The unit comprising the gears 11 and 12 is shiftable along the shaft 10 to different adjusted positions. As shown (Figs. 6 and 7), the gears 11 and 12 are in neutral position from which they may be shifted to engage the gear 11 with the pinion 15 or to engage the gear 12 with the pinion 16. Also, the unit comprising the gears 13 and 14 may be shifted laterally along the shaft 10 from the position shown in which the gear 14 engages a gear 17 to a position in which the gear 13 engages a gear 18, or to a position in which the gears 13 and 14 are in neutral position and out of engagement with both of said gears 17 and 18. The shifting mechanism for these gears (not shown) is arranged so that the gears 11 and 12 cannot be shifted from neutral position when either of the gears 13 or 14 is in engagement with either of the complementary gears 17 or 18; and, when either of the gears 11 or 12 is in engagement with the complementary pinion 15 or 16, the gears 13 and 14 must be in neutral position from which they cannot be shifted until the gears 11 and 12 are first shifted to neutral position. The shaft 10 may be rotated by power driven connections including a pulley 19. The pinions 15 and 16 and gears 17 and 18 are attached to a shaft 20.

An elongated helical pinion 21 is attached to the shaft 20 and is in constant mesh with a helical gear 22 mounted for lateral shifting movements on a shaft 23. The helical gear 22 is part of an integral unit comprising a sleeve 24, a pinion 25, and a collar 26, and they are shiftable laterally along the shaft 23 as a unit. The helical gear 22 is always in engagement with the helical pinion 21, which is integrally connected with the unit comprising the pinions 15 and 16 and the gears 17 and 18. Therefore, the helical pinion 21 is always rotated with the unit comprising the pinions 15 and 16 and the gears 17 and 18; and said unit may be rotated at selected speeds by shifting the gears 11 and 12 or the gears 13 and 14, as is known.

The helical gear 22 is in constant mesh with the helical pinion 21 in any of the shifted positions of said helical gear 22. The unit of which the helical gear 22 is a part may be shifted from the position in which said helical gear 22 meshes with a helical gear 27 (Fig. 6) to a position in which said helical gear 22 is out of engagement with the helical gear 27 and in which the helical pinion 25 is in engagement with a helical gear 28 integrally attached to the gear 27 (Fig. 7). Or, if desired, this unit may be shifted to a neutral position in which the gear 22 is out of engagement with the gear 27 and in which the pinion 25 is out of engagement with the gear 28.

The mechanism for shifting the unit comprising the gear 22 and pinion 25 to its different adjusted positions along the shaft 23 while the gear 22 remains in mesh with the pinion 21, is an important part of the present invention. One form of this mechanism is shown and comprises a longitudinally movable shaft or rod 29 mounted parallel with the shaft 23 and having on one end a handle 30 for engagement to shift said shaft 29 manually. A collar 31 is attached to said shaft at a distance from a cam 32, also attached to said shaft. A fork 33 is slidably mounted on and supported by the shaft 29 between the collar 31 and the cam 32, and engages the collar 26. A spring 34 is mounted on the shaft 29 between the collar 31 and the fork 33 and presses said fork toward the cam 32, permitting limited sliding movement of said fork along the shaft 29 toward and from the collar 31, as may be understood by comparison of Figs. 2 and 3. The engagement of the fork 33 with the collar 26 leaves said collar and the unit of which it is a part freely rotative about the axis of the shaft 23. A detent 35 is actuated toward the rod 29 by a spring 36 for engagement in spaced recesses 37 and 38 in said rod. Thus, the rod 29 will be yieldingly held in its different adjusted positions by said detent. When the gear 22 is in engagement with the gear 27, as in Fig. 6, the detent 35 is engaged in the recess 37, as shown in Fig. 4; and, when the pinion 25 is in engagement with the gear 28, as in Fig. 7, the detent 35 is engaged in the recess 38, as shown in Fig. 2.

Because of the inherent characteristic of the helical gears 21, 22, 25 and 28, as shown in Fig. 7, resultant thrust force would be exerted against the boss 23a when the tool carriage is under acceleration or during the first half of its forward motion, or during a cutting operation of the tool. This may be explained by assuming that the helix angle of the gears 22 and 25 is identical. Then a predominant thrust force would be exerted on the intermediate unit 22—25 by the pinion 25 in a direction opposite from that indicated by the arrow 39, overbalancing the thrust force exerted by the gear 22 in the direction of said arrow 39. However, during the latter half of the forward motion of the tool carriage 4 (toward the left as seen in Fig. 1), when the carriage is merely idling or not cutting, said carriage is decelerated by the driving mechanism and consequently all forces in the driving mechanism are reversed. This load reversal exerts thrust forces in the direction of the axis of the gears, tending to move the shiftable unit on the shaft 23 in the direction of the arrow 39, and it is necessary that they be confined or controlled to overcome this tendency. As shown, when the gear 22 is in engagement with the gear 27, the collar 26 is prevented from further movement in the direction of the arrow 39 by a rigid abutment 40 which may be one of the bearings for the shaft 23. A link 41 has one end connected with the fork 33 by a pivot 42 and its opposite end connected with one end of a link device 43 by a pivot 44. The outer end of the link device 43 is connected with a holder 45 by a pivot 46 rigidly and adjustably mounted in the frame 1. The holder 45 is rotatively and longitudinally adjustable in the frame 1. Such adjustment may be secured by screwing the holder 45 in a threaded hole in the frame 1, as shown, or otherwise as desired. When the pinion 25 is in engagement with the gear 28, as shown in Fig. 7, the toggle linkage comprising the link 41 and the link device 43 are extended, the detent 35 is engaged in the recess 38, and the fork 33 is held against the cam 32 by the spring 34, as shown in Fig. 2. This confines or controls the laterally movable helical pinion 25 and gear 22 and overcomes the tendency of said pinion and said gear to move in the direction of the arrow 39 and overcomes the tendency of the alternating thrust forces to move said pinion and gear and of all of the parts with which they are associated in the direction of the arrow 39. A spring 47 which is shown as attached to the fork 33 engages the link 41 and yieldingly holds said link in the position shown in Fig. 2 in which a cam 48 formed on the link 41 engages the cam 32 attached to the rod 29.

When the rod 29 is moved longitudinally to shift the unit 22—24—25 from the position shown in Fig. 7 to the position shown in Fig. 6, the cam 32 operates against the cam 48 and forces said cam 48 laterally from the position shown in Fig. 2 to and beyond the position shown in Fig. 3 in which the pivot 44 is disalined from the pivots 42 and 46, and ultimately to the position shown in Fig. 4, thereby disengaging the pinion 25 from the gear 28 and engaging the gear 22 with the gear 27. In this latter position, the collar 26 engages against the abutment 40 and the detent 35 is engaged in the recess 37 (Fig. 4).

In the particular embodiment chosen for illustration of the invention, the gear 28 which may be directly rotated by the pinion 25 or may be rotated by the gear 22 through the gear 27, functions as a crank device for oscillating the link 7 on the pivot 8. As shown, a crank 49 is attached to the gear 28 and is carried about the axis of said gear during rotation thereof. The crank 49 may be engaged in a slot 50 formed in the link 7 to function as a crank device for oscillating said link.

The two primary shifters 51 and 52 are movable longitudinally to shift the gear unit 11—12 and the gear unit 13—14, respectively, in the usual manner. When both gear units 11—12 and 13—14 are in neutral position, either of said gear units may be shifted to effective driving position, but both cannot be shifted from neutral position at the same time; nor can either be shifted from neutral position when the other is in effective driving position. Suitable safety equipment (not shown) to prevent such undesired shifting of the gear units 11—12 and 13—14 is included in the machine in which the present invention is shown. Therefore, to initiate operation of the helical gearing to operate the machine proper, it is only necessary to shift the gear unit 11—12 to an effective driving position, or to shift the gear unit 13—14 to an effective driving position. Before operation of the gear units 11—12 and 13—14 is started, the intermediate helical gear unit 22—25 should be shifted to one of its effective driving positions. One of the effective driving positions of said gear unit 22—25 is that in which the gear 22 engages the gear 27 with the pinion 25 out of engagement with the gear 28. The other effective position of the gear gear unit 22—25 is that in which the pinion 25 engages the gear 28 with the gear 22 out of engagement with the gear 27.

When the gear 22 is moved into engagement with the gear 27, the collar 26 is moved against the rigid abutment 40 as an incident to such axial movement of the gears 22 and 25 to effect such engagement. Vibration is substantially prevented by engagement of the detent 35 in the recess 37 when the gear 22 is in engagement with the gear 27. When the gear unit 22—25 is shifted laterally to engage the pinion 25 with the gear 28 and, incidentally, disengage the gear 22 from the gear 27, the toggle link device is extended to holding position, as shown in Fig. 2, thereby preventing any movement of the intermediate helical gearing 22—25 in the direction of the arrow 39 by thrust forces or by other causes. In this latter position of the intermediate helical gearing 22—25, the detent 35 is engaged in the recess 38, thereby preventing unintentional movement of the gears 22 and 25 by vibration of the machine.

From the foregoing, it is plain that this invention attains all of its intended objects and purposes very efficiently and satisfactorily. The invention is practicable and self-contained, and is easily operated and controlled. The construction and arrangement of the parts may be varied within the scope of equivalent limits and as required to adapt the invention for different uses without departure from the nature and principle of the invention.

We claim:

1. In a machine having a helical driving pinion rotative at selected speeds, helical gears for operating the machine, and a variable speed helical gear unit having constant engagement with said pinion for operation thereby at any of said selected speeds; a device for shifting said gear unit to different adjusted positions for operating said gears at different speeds as desired by operation of said gear unit at one selected speed, toggle linkage pivotally connected with said device and adjustable in one position for positively holding said device and thereby said gear unit in one position and positively preventing movement of said gear unit from said adjusted position by the thrust of said pinion and said gears, and manually operative means movable relative to said linkage for displacing said linkage from said one position and leaving said device movable relative to said means to shift said gear unit.

2. In a machine having a helical driving pinion rotative at selected speeds, helical gears for operating the machine, and a variable speed helical gear unit having constant engagement with said pinion for operation thereby at any of said selected speeds; a longitudinally movable shaft, a device supported by said shaft for shifting said gear unit to different adjusted positions for operating said gears and thereby the machine at different speeds as desired by operation of said gear unit at one selected speed, means yieldingly holding said device in one position on said shaft and for moving said device with said shaft when said shaft is moved in one direction, and means connected with said device for positively preventing movement of said device and thereby said gear unit from an adjusted position by the thrust of said pinion on said gears.

3. In a machine having a helical driving pinion rotative at selected speeds, helical gears for operating the machine, and a variable speed helical gear unit having constant engagement with said pinion for operation thereby at any of said selected speeds; a longitudinally movable shaft, a device supported by said shaft for shifting said gear unit to different adjusted positions for operating said gears and thereby the machine at different speeds as desired by operation of said gear unit at any of said selected speeds, means yieldingly holding said device in one position on said shaft and for moving said device with said shaft when said shaft is moved in one direction, and a rigid abutment positively preventing movement of said gear unit in one direction beyond an adjusted position.

4. In a machine having a helical driving pinion rotative at selected speeds, helical gears for operating the machine, and a variable speed helical gear unit having constant engagement with said pinion for operation thereby at any of said selected speeds; a longitudinally movable shaft, a device supported by said shaft for shifting said gear unit to different adjusted positions for operating said gears and thereby the machine at different speeds as desired by operation of said gear unit at any of said selected speeds, means yieldingly holding said device on one position on said shaft and for moving said device with said shaft when said shaft is moved in one direction, a rigid abutment positively preventing movement of said gear unit in one direction beyond an adjusted position, and linkage pivotally connected with said device for positively holding said device and thereby said gear unit in another adjusted position and preventing movement of said gear unit from said last named position by the thrust of said pinion on said gears.

5. In a machine having a helical driving pinion rotative at selected speeds, helical gears for operating the machine, and a variable speed helical gear unit having constant engagement with said pinion for operation thereby at any of said selected speeds; a longitudinally movable shaft, a device supported by said shaft for shifting said gear unit to different adjusted positions for operating said gears and thereby the machine at different speeds as desired by operation of said gear unit at any of said selected speeds, means yieldingly holding said device on one position on said shaft and for moving said device with said shaft when said shaft is moved in one direction, a rigid abutment positively preventing movement of said gear unit in one direction beyond an adjusted position, linkage pivotally connected with said device for positively holding said device and thereby said gear unit in another adjusted position and preventing movement of said gear unit from said last named position by the thrust of said pinion or said gears, and manually operative means for displacing said linkage incidental to the shifting of said gears from one position to another.

6. In a machine having a helical driving pinion rotative at selected speeds, helical gears for operating the machine, and a variable speed helical gear unit having constant engagement with said pinion for operation thereby at any of said selected speeds; a longitudinally movable shaft, a device supported by said shaft for shifting said gear unit to different adjusted positions for operating said gears and thereby the machine at different speeds as desired by operation of said gear unit at any one selected speed, toggle linkage pivotally connected with said device for positively holding said device and thereby said gear unit in one position and positively preventing movement of said gear unit from an adjusted position, a cam operated by said shaft for displacing said linkage and leaving said device movable by said shaft to move said gear unit to another adjusted position for operating said gears, and yielding means cooperating with said device and said cam and linkage leaving said shaft and said cam free for operation to displace said linkage and to move said device to said other adjusted position as aforesaid.

JOHN H. SCHREIBER.
FRANCIS H. DEAN.